United States Patent Office 2,886,553
Patented May 12, 1959

2,886,553

PROCESS FOR THE SUSPENSION POLYMERIZATION OF VINYLIDENE AROMATIC HYDROCARBONS HAVING RUBBERY CONJUGATED 1,3-DIENE POLYMERS DISSOLVED THEREIN

Alvin Stein and Robert L. Walter, Springfield, Mass., assignors to Monsanto Chemical Company, St. Louis, Mo., a corporation of Delaware No Drawing. Application April 1, 1957
Serial No. 649,594

8 Claims. (Cl. 260—45.5)

The present invention relates to an improved process for polymerizing vinylidene aromatic hydrocarbon and ring-halogenated vinylidene aromatic hydrocarbon monomers having rubbery conjugated 1,3-diene polymers dissolved therein by a suspension polymerization process. In the subsequent description of this invention, for the sake of brevity, frequently the vinylidene aromatic hydrocarbon monomer solution of the rubbery conjugated 1,3-diene polymer will be referred to simply as the "vinylidene aromatic hydrocarbon solution" or the "vinylidene monomer solution."

Processes for preparing polymers from vinylidene aromatic hydrocarbon and ring-halogenated vinylidene aromatic hydrocarbon monomers having rubbery conjugated 1,3-diene polymers dissolved therein by suspension polymerization processes are known. See the copending application of John B. Ott, Serial No. 573,074, filed March 22, 1956. One method for carrying out such polymerizations comprises charging the vinylidene monomer solution, water, suspending agent and polymerization initiator to a suitable reaction vessel and agitating and heating the reaction mixture until the polymerization is substantially complete. In an alternate procedure, the vinylidene monomer solution is first stirred and heated en masse until approximately 15% or more of the vinylidene monomer is polymerized. The partially polymerized monomer solution is then charged with water and suspending agent to a stirred reaction vessel and the polymerization is continued as in the first procedure described.

There are difficulties associated with both of the suspension polymerization processes described in the paragraph above. When the vinylidene monomer solution is charged directly in the suspension polymerization process, certain of the properties of the resulting polymers are relatively poor. This is particularly true of the moldability of the polymers and the surface of molded or extruded articles prepared therefrom. Polymers having good all around properties can be obtained by the alternate polymerization process in which the vinylidene monomer solution is first partially polymerized en masse. This alternate process entails long processing cycles, however, as the vinylidene monomer solution has a very high viscosity and the initial mass polymerization must be carried out at very slow rates of polymerization to insure adequate heat transfer so as to prevent overheating of the polymerizing mass. Moreover, there are limits on the viscosity of the partially polymerized vinylidene monomer solutions that can be handled in conventional stirred reactors. This factor plus the consideration that the vinylidene monomer solution must be prepolymerized to a conversion of at least 15% and preferably at least 20% before being charged to the suspension polymerization step limits the percentage of the rubbery conjugated 1,3-diene polymer that can be incorporated in the polymer. In turn, this upper limit on the percentage of rubber that can be incorporated in the polymer limits the physical properties, particularly the impact strength, that can be obtained therein.

It is an object of this invention to provide an improved process for the suspension polymerization of vinylidene aromatic hydrocarbon and ring-halogenated vinylidene aromatic hydrocarbon monomers having a rubbery conjugated 1,3-diene polymer dissolved therein.

Another object of this invention is to provide an improved process for the suspension polymerization of vinylidene aromatic hydrocarbon and ring-halogenated vinylidene aromatic hydrocarbon monomers having a rubbery conjugated 1,3-diene dissolved therein that can be carried out at relatively fast polymerization rates.

A further object of this invention is to provide an improved process for the suspension polymerization of vinylidene aromatic hydrocarbon and ring-halogenated vinylidene aromatic hydrocarbon monomers having large quantities of rubbery conjugated 1,3-diene polymers dissolved therein.

Other objects and advantages of this invention will be apparent from the following detailed description thereof.

In the process of this invention a heterogeneous mixture of water and a vinylidene monomer of the group consisting of a vinylidene aromatic hydrocarbon monomer, a ring-halogenated vinylidene aromatic hydrocarbon monomer and mixtures thereof having a rubbery conjugated 1,3-diene polymer dissolved therein is agitated and heated, in the absence of suspending agents, until (1) at least 15% of the vinylidene monomer has been polymerized and (2) the partially polymerized vinylidene monomer solution has a viscosity of at least about 75 poises at 40° C. When this degree of polymerization is reached, a suspending agent for the vinylidene monomer solution is added to the system and agitation and heating are continued until the vinylidene monomer is substantially completely polymerized. By this process, it is possible to polymerize vinylidene monomer solutions having larger percentages of a rubbery conjugated 1,3-diene polymer dissolved therein than is otherwise possible with processes presently known. In addition, the reaction cycle of the present process is materially shorter than the reaction cycles of previously known processes in which the vinylidene monomer solution is initially partially polymerized en masse.

The following examples are set forth to illustrate more clearly the principle and practice of this invention to those skilled in the art. Where parts are mentioned, they are parts by weight.

*Example 1*

To a glass-lined, stirred autoclave are charged 100 parts of freshly distilled water and 100 parts of a polymerizable mixture consisting of 94 parts of styrene monomer and 6 parts of a rubbery conjugated 1,3-diene polymer containing 75% butadiene and 25% styrene. In addition to the styrene monomer and rubber, the polymerizable mixture contains 0.05% ditertiary butyl peroxide, 0.3% of an anti-oxidant, 0.1% of a commercial $C_{12}$ mercaptan modifier and 2.0% of a refined hydrocarbon oil lubricant. After the atmosphere in the reaction vessel is swept free of oxygen with nitrogen, the reaction mixture is stirred and heated for 4 hours at 120° C. At the end of this period, approximately 40% of the styrene monomer is polymerized and the partially polymerized styrene monomer solution has a viscosity in excess of 200 poises at 40° C.

There is then charged to the reaction vessel 100 parts of water having dissolved therein 0.05 part of calcium chloride and 0.18 part of an interpolymer of 95.5 mol percent acrylic acid and 4.5 mol percent 2-ethylhexyl acrylate which has a specific viscosity of about 4.0 as determined in a 1% solution in water at 25° C. The reactor is pressurized with nitrogen and the reaction mixture is agitated and heated for 3 hours at 130° C. and 5 hours at 140° C. The product is obtained in essentially quantitative yield and in the form of small spherical beads. The polymer has properties fully comparable to or in some cases superior to those of the polymer prepared by the prior art process described in Comparative Example I set forth below. The overall reaction cycle is 12 hours.

*Comparative Example I*

The styrene monomer rubbery butadiene-styrene interpolymer solution employed in Example I is polymerized by agitating and heating the styrene monomer solution en masse at a temperature of 110° C. Because of the poor heat transfer characteristics of the highly viscous solution, 110° C. is the maximum temperature that can be employed in this initial polymerization step. Nine hours are required to polymerize 33% of the styrene monomer and the resulting partially polymerized solution has a viscosity of about 120 poises at 40° C.

The partially polymerized styrene solution is added to 200 parts of water containing 0.18 part of the acrylic acid-2-ethylhexyl acrylate interpolymer described in Example I and 0.05 part of calcium chloride. The polymerization is completed under nitrogen pressure by agitating the reaction mixture for 3 hours at 130° C. and 5 hours at 140° C. The yield of finely divided polymer particles is quantitative. The overall reaction cycle is 17 hours as compared with the 12 hour reaction cycle of Example I.

*Example II*

Example I is repeated except that the polymerizable mixture employed contains 10 parts of the rubbery 75/25 butadiene-styrene interpolymer dissolved in 90 parts of styrene monomer. At the end of the initial 4 hour polymerization period, 40% of the styrene monomer is polymerized and the partially polymerized styrene solution has a viscosity substantially in excess of 200 poises at 40° C. The results obtained are comparable to those obtained in Example I.

*Example III*

Into the reactor described in Example I, are charged 100 parts of water and 100 parts of a polymerizable mixture comprising 6 parts of the 75/25 butadiene-styrene interpolymer described in Example I, 84 parts of styrene monomer and 10 parts of alpha-methyl styrene monomer, said polymerizable mixture also containing 0.05% of ditertiary butyl peroxide, 0.3% of an antioxidant, 0.1% of a commercial $C_{12}$ mercaptan modifier and 2.0% of a refined hydrocarbon oil lubricant. The atmosphere in the reactor is swept free of oxygen with nitrogen and the reaction mixture is agitated and heated for 4 hours at 120° C. At the end of this time, approximately 40% of the monomeric components of the mixture have been polymerized and the viscosity of the partially polymerized solution is in excess of 200 poises at 40° C.

One hundred parts of water containing 0.18 part of the acrylic acid-2-ethylhexyl acrylate interpolymer described in Example I and 0.05 part of calcium chloride are charged to the reaction vessel. The reaction mixture is pressurized with nitrogen and agitated and heated for 4 hours at 130° C. and 9 hours at 135° C. The resultant polymer is obtained in the form of small discrete particles.

*Example IV*

Example I is repeated except that 20 parts of the butadiene-styrene interpolymer are dissolved in 80 parts of styrene monomer and the initial polymerization step in the absence of the dispersing agent is carried out for only 3 hours in lieu of the 4 hours employed in Example I. At the end of the 3 hour period, approximately 25% of the styrene monomer has been polymerized and the viscosity of the partially polymerized styrene monomer solution is substantially in excess of 200 poises at 40° C. The polymerization is completed by agitating and heating the reaction mixture under nitrogen pressure for 8 hours at 130° C. The results obtained are comparable to those of Example I.

*Example V*

Example I is repeated except that the polymerizable mixture employed consists of 6 parts of a 75/25 butadiene-styrene interpolymer, 66 parts of styrene monomer, and 28 parts of acrylonitrile monomer. Comparable results are obtained.

In the initial step of the process of the invention, water and the vinylidene monomer solution of the rubbery conjugated 1,3-diene polymer, preferably containing a free radical polymerization initiator, are charged to a reactor and heated and agitated, in the absence of a suspending agent, until (1) at least 15% of the vinylidene monomer has polymerized and (2) the viscosity of the partially polymerized vinylidene monomer solution is at least 75 poises at 40° C. It is important to note that the initial polymerization must be continued in the absence of suspending agents until both of the above conditions are met. If the suspending agent is added before either or both of the above stated conditions is reached, the final polymer will have inferior moldability and/or surface properties. In carrying out the initial polymerization step, it is customary to charge the entire quantity of water that will be employed in the suspension polymerization step, except for a small quantity of water that may be withheld and employed as a solvent for the dispersing agent that is ultimately added to the system. In nearly all cases, the quantity of water employed in the initial step should constitute at least about 35% or more preferably at least 50% of the weight of the vinylidene monomer solution.

It is desirable to polymerize the vinylidene monomer solution to the highest conversion that can be conveniently handled in the initial polymerization step. In most cases, the limiting factor in this step of the process will be the viscosity of the partially polymerized vinylidene monomer solution. This viscosity, aside from the degree of monomer conversion, is dependent primarily upon the quantity of rubbery conjugated 1,3-diene polymer included in the monomer solution and the molecular weight of said rubbery conjugated 1,3-diene polymer. In most cases, vinylidene monomer solutions containing 20% or more of the rubbery conjugated 1,3-diene polymer should be polymerized to a conversion of at least 15%, or preferably, at least 20%. On the other hand, vinylidene monomer solutions containing 10% or less of the rubbery conjugated 1,3-diene polymer should be polymerized to a conversion of at least 25% and, more preferably, at least about 35%.

In plotting solution viscosity vs. conversion in the initial polymerization step, it is sometimes observed that the viscosity will rise to a maximum, then fall and then again start rising thereby forming an initial "peak" in the viscosity-conversion curve. It is highly desirable to carry the conversion in the initial polymerization beyond this "peak."

After the vinylidene monomer solution is partially polymerized to the extent indicated above, a suitable dispersing agent and additional water, if desired or needed, are added to the reaction system and heat and agitation are continued until the vinylidene monomer is substantially completely polymerized.

Although the invention is not limited to the employment of any particular dispersing agent, we prefer to use for this purpose water-soluble interpolymers of (1) an acidic monomer of the group consisting of acrylic acid, methacrylic acid and mixtures thereof and (2) a monomer of the group consisting of 2-ethylhexyl acrylate, 2-ethylhexyl methacrylate and mixtures thereof. For the purposes of this invention, such interpolymers are considered to be water-soluble if 0.5 part of the interpolymer will dissolve in 99.5 parts of water at 25° C. Such water-soluble interpolymers should contain from 1.5 to 6.5 mol percent and preferably 2.0 to 5.0 mol percent of the 2-ethylhexyl ester with the balance of the interpolymer being the acidic monomer. For reasons of both cost and performance, it is preferred to employ interpolymers of acrylic acid and 2-ethylhexyl acrylate.

The dispersing action of the water-soluble interpolymers is affected but slightly by wide variations in molecular weight. The preferred dispersing agents, however, have specific viscosities of at least 0.1 when methacrylic acid is the acidic monomer included in the interpolymer and at least about 0.8 when acrylic acid is the acidic monomer included in the interpolymer. Both of the above specific viscosity values are determined in 1% solutions in water at 25° C. in accordance with the well-known formula:

$$\text{Specific viscosity} = \frac{\text{solution viscosity} - \text{solvent viscosity}}{\text{solvent viscosity}}$$

Methods for preparing such water-soluble dispersing agents are described in detail in the copending application of John B. Ott, Serial No. 573,069, filed March 22, 1956, and that description is incorporated herein by reference. The preferred process for synthesizing the water-soluble dispering agents comprises dissolving an appropriate monomer mixture and a free radical generating polymerization initiator in an organic liquid which is a solvent for the monomer mixture, but a non-solvent for the interpolymer prepared therefrom and heating to effect polymerization.

Usually only a small concentration of dispersing agent is necessary, 0.02–1.0% and more particularly 0.05–0.5% based upon the amount of water used is usually sufficient. Frequently, there is found to be an optimum amount of dispersing agent to be employed for obtaining a minimum particle size and amounts of dispersing agent above or below this optimum amount produce polymers having a larger particle size. It is usually preferred to employ the smallest amount of dispersing agent that will produce polymers of the desired particle size.

In carrying out the suspension polymerization step of the present invention it is usually preferred to maintain the pH of the aqueous dispersing medium below about 7.0. When employing the water-soluble acidic polymers of the type previously described, the pH of the aqueous dispersing medium will be in the range of about 3.0 to 4.0 which is close to the optimum pH. If desired, small amounts of inorganic salts may be included in the aqueous medium to suppress emulsification of the polymer.

The compositions which may be polymerized by the method of this invention comprise solutions of a rubbery conjugated 1,3-diene polymer in a vinylidene aromatic hydrocarbon or a ring-halogenated vinylidene aromatic hydrocarbon monomer or a monomer mixture consisting predominantly of a vinylidene aromatic hydrocarbon or a ring-halogenated vinylidene aromatic hydrocarbon. Although vinylidene monomer solutions containing minor amounts of a rubbery conjugated 1,3-diene polymer, e.g., less than 1%, may be polymerized by the process of the invention, the optimum value of the process is obtained in polymerizing vinylidene monomer solutions containing substantial amounts of the rubbery conjugated 1,3-diene polymer, e.g., more than 2% and especially more than 5% of the rubbery conjugated 1,3-diene polymer. The process has been employed successfully to polymerize styrene monomer having as much as 25 weight percent of a rubbery butadiene-styrene interpolymer dissolved therein. The upper limit on the rubbery conjugated 1,3-diene polymer content will be set primarily by the viscosity obtained in the initial polymerization step.

The rubbery conjugated 1,3-diene polymer component of the polymerizable mixture may be essentially any rubbery conjugated 1,3-diene polymer having a brittle temperature of 0° C. or less, said brittle temperature being determined by ASTM test procedure D746–52T. Typical examples of such polymers include natural rubber itself, synthetic polyisoprene, polybutadiene, interpolymers of butadiene and/or isoprene with styrene, acrylonitrile, acrylate esters, etc.

The monomeric component of the polymerizable mixture may consist of (1) a vinylidene aromatic hydrocarbon or a ring-halogenated vinylidene aromatic hydrocarbon such as styrene; vinyl naphthalene; ring-substituted alkylstyrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-substituted alkyl-ring substituted halostyrenes, e.g., 2-chloro-2-methylstyrene, 2-6-dichloro-4-methylstyrene, etc.; (2) a mixture of two or more vinylidene aromatic hydrocarbons or ring-halogenated vinylidene aromatic hydrocarbons which may include a vinylidene aromatic hydrocarbon which will not readily homopolymerize, e.g., alpha-methyl styrene or (3) a mixture of a vinylidene aromatic hydrocarbon or a ring-halogenated vinylidene aromatic hydrocarbon with a lesser amount of a vinylidene monomer interpolymerizable therewith. Examples of such interpolymerizable vinylidene monomers include conjugated 1,3-dienes, e.g., butadiene, isoprene, etc., alpha, beta-unsaturated monobasic acids and derivatives thereof, e.g., acrylic acid, methyl acrylate, ethyl acrylate, butyl acrylate, 2-ethylhexyl acrylate and the corresponding esters of methacrylic acid, acrylamide, methacrylamide, acrylonitrile, methacrylonitrile, etc.

In addition to the rubbery conjugated 1,3-diene polymer and the vinylidene aromatic hydrocarbon or ring-halogenated vinylidene aromatic hydrocarbon monomer, the polymerizable mixtures may also contain free radical generating polymerization initiators, anti-oxidants, plasticizers, heat and light stabilizers, polymerization modifiers, colorants, etc.

The above descriptions and particularly the examples are set forth by way of illustration only. Many other variations and modifications thereof will be apparent to those skilled in the art and can be made without departing from the spirit and scope of the invention herein described.

What is claimed is:

1. A process for preparing polymerization products in granular form which comprises (1) agitating and heating a mixture of at least about 35 parts of water and 100 parts of a solution of a rubbery conjugated 1,3-diene polymer in a vinylidene monomer of the group consisting of a vinylidene aromatic hydrocarbon monomer, a ring-halogenated vinylidene aromatic hydrocarbon and mixtures thereof, in the absence of a dispering agent, until at least about 15 weight percent of the monomeric constituents of the vinylidene aromatic hydrocarbon monomer solution have polymerized and said partially polymerized vinylidene aromatic hydrocarbon monomer solution has a viscosity of at least 75 poises at 40° C., (2) adding a dispersing agent to said mixture of water and partially polymerized vinylidene aromatic hydrocarbon monomer solution and (3) continuing to agitate and heat said water and partially polymerized vinylidene aromatic hydrocarbon monomer solution until said vinylidene aromatic hydrocarbon monomer is substantially completely polymerized.

2. A process as in claim 1 in which the dispersing agent added to the mixture of water and partially polymerized vinylidene aromatic hydrocarbon monomer solution is a water-soluble interpolymer consisting of 93.5–98.5 mol percent of an acidic monomer of the group consisting of arcylic acid, methacrylic acid and mixtures thereof and, correspondingly, 6.5–1.5 mol percent of a monomer of the group consisting of 2-ethylhexyl acrylate, 2-ethylhexyl methacrylate and mixtures thereof.

3. A process as in claim 2 in which the material polymerized consists of 1–25 parts of a rubbery polymer of 1,3-butadiene and, correspondingly, 99–75 parts of a monomer of the group consisting of (a) styrene and (b) mixtures of a major amount of styrene and a minor amount of a vinylidene monomer interpolymerizable therewith.

4. A process as in claim 3 in which the rubbery polymer of 1,3-butadiene is an interpolymer of 1,3-butadiene and styrene.

5. A process as in claim 3 in which the vinylidene monomer employed comprises a mixture of a major amount of styrene and a minor amount of alpha-methyl styrene.

6. A process as in claim 3 in which the vinylidene monomer employed comprises a mixture of a major amount of styrene and a minor amount of acrylonitrile.

7. A process as in claim 4 in which the vinylidene monomer employed comprises a mixture of a major amount of styrene and a minor amount of alpha-methylstyrene.

8. A process as in claim 4 in which the vinylidene monomer employed comprises a mixture of a major amount of styrene and a minor amount of acrylonitrile.

References Cited in the file of this patent

FOREIGN PATENTS

| | | |
|---|---|---|
| 707,548 | Great Britain | Apr. 21, 1954 |
| 151,308 | Australia | May 7, 1953 |

UNITED STATES PATENT OFFICE

CERTIFICATE OF CORRECTION

Patent No. 2,886,553 May 12, 1959

Alvin Stein et al

It is hereby certified that error appears in the printed specification of the above numbered patent requiring correction and that the said Letters Patent should read as corrected below.

Column 6, line 54, after "least" insert -- about --.

Signed and sealed this 13th day of October 1959.

(SEAL)
Attest:

KARL H. AXLINE
Attesting Officer

ROBERT C. WATSON
Commissioner of Patents